(12) United States Patent
Hurich

(10) Patent No.: US 6,816,953 B2
(45) Date of Patent: Nov. 9, 2004

(54) METHOD OF PROTECTING A MICROCOMPUTER SYSTEM AGAINST MANIPULATION OF ITS PROGRAM

(75) Inventor: Martin Hurich, Jhrlerstein (DE)

(73) Assignee: Robert Bosch GmbH, Stuttgart (DE)

( * ) Notice: Subject to any disclaimer, the term of this patent is extended or adjusted under 35 U.S.C. 154(b) by 145 days.

(21) Appl. No.: 10/187,481

(22) Filed: Jul. 1, 2002

(65) Prior Publication Data

US 2003/0021165 A1 Jan. 30, 2003

(30) Foreign Application Priority Data

Jul. 2, 2001 (DE) .......................................... 101 31 577

(51) Int. Cl.[7] .............................................. G06F 12/14
(52) U.S. Cl. ...................................................... 711/163
(58) Field of Search ................................ 711/163, 164; 713/202

(56) References Cited

U.S. PATENT DOCUMENTS 6,360,325 B1 * 3/2002 Chao .......................... 713/200
6,604,024 B2 * 8/2003 Braun et al. .................... 701/1

FOREIGN PATENT DOCUMENTS

DE          197 23 332          9/1998

* cited by examiner

Primary Examiner—Hiep T. Nguyen
(74) Attorney, Agent, or Firm—Kenyon & Kenyon

(57) ABSTRACT

A method of protecting a microcomputer system against manipulation of its program, in which the microcomputer system includes a rewritable memory in which at least one portion of the program is stored, and in which a check is performed as part of a checking procedure to determine whether at least one portion of the rewritable memory includes a specified content. To permit detection of a manipulated program in the shortest amount of time, the checking procedure is executed cyclically at preselectable intervals during operation of the microcomputer system. In addition, execution of the program is blocked immediately as part of the checking procedure if the rewritable memory or a portion thereof does not include the specified content.

10 Claims, 2 Drawing Sheets

METHOD OF PROTECTING A MICROCOMPUTER SYSTEM AGAINST MANIPULATION OF ITS PROGRAM

FIELD OF THE INVENTION

The present invention relates to a method of protecting a microcomputer system against manipulation of its program. The microcomputer system includes a rewritable memory in which at least one portion of the program is stored. In this method, a check is performed as part of a checking procedure to determine whether at least one portion of the rewritable memory includes a specified content.

The present invention also relates to a microcomputer system which is protected against manipulation of its program. The microcomputer system includes a rewritable memory in which at least one portion of the program is stored. In addition, the microcomputer system includes for its protection a checking arrangement for checking on whether at least one portion of the rewritable memory includes a preselected content.

BACKGROUND INFORMATION

A method and a microcomputer system for protecting against manipulation of a program is referred to in German Published Patent Application No. 197 23 332, for example. The method discussed in German Published Patent Application No. 197 23 332 is used in particular to protect an automotive control device against manipulation of its control program. The control device controls and/or regulates automotive functions, for example of an internal combustion engine, an electronic control (steer-by-wire) or an electronic brake (brake-by-wire). In the method discussed in German Published Patent Application No. 197 23 332, a boot routine is executed each time the microcomputer system is powered up, a checking procedure is executed as part of the boot routine. The checking procedure is implemented, for example, as a checking program, which is stored in a read-only memory of the microcomputer system. In execution of the checking procedure, a code word is determined from at least one portion of the memory content of the rewritable memory with the help of an encryption algorithm and compared with a reference code word stored in the rewritable memory. The code word is a checksum, for example. Execution of the control program stored in the rewritable memory of the control device is blocked if the code word determined is not the same as the reference code word.

If a manipulated program has been stored in the rewritable memory, the code word determined via the memory content of the rewritable memory will usually differ from the reference code word stored, and execution of the manipulated program is blocked. This prevents the automotive functions or automotive units that are to be regulated or controlled by the control device from being damaged by manipulation of the control program.

Various encryption algorithms may be used to form the code word. In particular, cross-checksums and/or longitudinal checksums may be formed (even parity check) or a cyclic redundancy check (CRC) may be used, in which code words are generated in blocks from the content of the rewritable memory and compared with reference code words. The more complex the encryption algorithms used to calculate the code word, the more difficult it is for an unauthorized third party to overcome the protection against manipulation and tuning. On the other hand, a complicated encryption algorithm requires a great deal of computation capacity (memory and computing time) of a computer core, in particular a microprocessor, of the microcomputer system. However, it is problematical that unlimited time is not available for checking the content of the rewritable memory in a microcomputer system. There is thus a destination conflict between secure and reliable protection against manipulation and tuning of a microcomputer system and rapid execution of the checking procedure without any significant delay in execution of the program.

In a microcomputer system, the power of the microprocessors used is not unlimited for reasons of cost and configuration (high-power microprocessors require a relatively large structure, have a relatively high power consumption and generate a great deal of waste heat which is dissipated from the microcomputer system). For this reason, the checking procedure in other prior systems is executed only at certain points in time when more time is available for complete processing of the checking program, e.g., when powering up the microcomputer system or after reprogramming or new programming of the rewritable memory. As an alternative, it may also be allowed to process only a portion of the checking program, which takes less time but reduces the certainty and reliability of the protection against manipulation and tuning.

If the checking procedure reveals that the checked portion of the rewritable memory includes a specified content, a corresponding marker is stored in a memory of the microcomputer system. By querying this marker at later points in time, e.g., each time the microcomputer system is powered up, it is allowed within an extremely short period of time to check on whether or not the program stored in the rewritable memory has been manipulated. In the method discussed in German Published Patent Application No. 197 23 332, however, no check of the content of other portions of the rewritable memory or even the entire rewritable memory during operation of the microcomputer system, i.e., while the program is running, is performed. Another check is performed only on reaching the point in time for performing the checking procedure again, e.g., when powering up the microcomputer system again. In the exemplary method according to the present invention, it may therefore take a relatively long time until manipulation of the program of a microcomputer system is detected and suitable countermeasures have been taken.

SUMMARY OF THE INVENTION

It is an object of the exemplary embodiment and/or exemplary method of the present invention to reliably and with certainty protect a microcomputer system against manipulation of its program, so that manipulation is detectable within the shortest period of time.

The exemplary embodiment and/or exemplary method of the present invention provides that the checking procedure be executed cyclically at preselectable intervals during operation of the microcomputer system.

According to the exemplary embodiment and/or exemplary method of the present invention, the checking procedure is thus executed not only at discrete points in time, e.g., following a reprogramming or new programming of the rewritable memory, but instead cyclically during normal operation of the microcomputer system, i.e., when running the program. Cyclic execution of the checking procedure may be performed in addition to or instead of execution of the checking procedure at discrete points in time, e.g., after reprogramming or new programming of the rewritable memory. The portion of the checking procedure executed during a cycle is reduced so that running of the program is hardly impaired by a computer core, in particular by a microprocessor, of the microcomputer system. A reduction in the checking procedure may be achieved, for example, by checking only a small portion of the rewritable memory in each cycle. The entire rewritable memory may be checked according to the present invention after only a relatively short operation of the microcomputer system and repeated execution of various portions of the checking program. If it is found in execution of the checking procedure that the rewritable memory or the checked portion of the rewritable memory does not include a specified content, suitable measures are initiated immediately. For example, the program or the checked portion of the program is declared invalid immediately and execution of the program, i.e., the checked portion of the program, is blocked immediately.

Various checking procedures which may be used in conjunction with the exemplary embodiment and/or exemplary method of the present invention are referred to in other prior systems. First, a method referred to in German Published Patent Application No 197 23 332 may be used, for example. In this method, a code word, e.g., a checksum, is formed over the rewritable memory or at least one portion of the rewritable memory and compared with a reference code word. In addition, the content of the rewritable memory may be marked or encrypted on the basis of an asymmetrical encryption method within the checking procedure. By checking the signature of decryption of a reprogrammed or newly programmed program, it may be ascertained as to whether or not the new program has been manipulated. Finally, as other method markers may be introduced into the program at defined locations and checked according to specified procedures. This method may allow low demand on the computing capacity of the microcomputer system. The disadvantage, however, is that the content of a program to be checked does not enter into the check and therefore only another completely different program without markers is detectable as manipulated.

According to an exemplary embodiment of the present invention, execution of the program may be blocked immediately as part of the checking procedure if the rewritable memory or a portion thereof does not include the specified content. Due to the fact that execution of the program is blocked immediately following the cyclically executed checking procedure if it is found to have been manipulated, rapid and reliable blocking of execution of the program is allowed, thus promptly preventing damage to a unit controlled or regulated by the microcomputer system.

According to an exemplary embodiment of the present invention, various portions of the rewritable memory may be checked by the checking procedure within a plurality cycles. The portions of the rewritable memory to be checked during a cycle of the checking procedure may be selected either randomly or on the basis of a predefined algorithm. In the case of a fixed algorithm, it may be predicted as to exactly when the entire rewritable memory has been checked. In the case of a random selection of the portion of the rewritable memory to be checked, it may be determined statistically as to when the entire rewritable memory has been checked. The size of the portions of the rewritable memory to be checked within a cycle depends on the computing power of the computer core of the microprocessor system and the available computation time. The size of the portions should be selected so as to prevent any negative effect on execution of the program due to the execution of the checking procedure.

According to another exemplary embodiment of the present invention, a preselectable marker is stored in a storage area of the microcomputer system if the rewritable memory or a portion thereof includes the specified content; the content of the storage area is checked during the execution of the program; and the marker is deleted to block the execution of the program. The presence of the marker in the storage area of the microcomputer system thus means that the program stored in the rewritable memory has not been manipulated. The marker is deleted when manipulation of the program is detected. The marker is in the form of a test pattern, for example. It may include one bit, multiple bits or even one or more bytes.

According to an alternative exemplary embodiment of the present invention, a storage area of the microcomputer system is checked during execution of the program, and a preselectable marker is stored in the storage area to block execution of the program. According to this alternative exemplary embodiment, the storage area of the microcomputer system thus does not have any marker with a non-manipulated program. However, if manipulation of the program is detected, a corresponding marker is stored in the storage area. According to another exemplary embodiment of the present invention, the cyclic execution of the checking procedure may run as a background application during operation of the microcomputer system. The checking procedure is thus always active in the background of running the program by the computer core and is called up cyclically at preselectable points in time.

According to an alternative exemplary embodiment of the present invention, the cyclic execution of the checking procedure may run at noncritical running times during operation of the microcomputer system. Noncritical running times are understood to be points in time when running time does not play a role, i.e., utilization of the computer core due to running of the program is low. This is the case, for example, during steady-state operation of the microcomputer system.

In addition, a use of the exemplary method according to the present invention for protecting an automotive control device against manipulation of its control program includes using the control device to control and/or regulate an automotive function.

The checking arrangement may also execute the check of the rewritable memory cyclically at preselectable intervals during operation of the microcomputer system.

According to an exemplary embodiment of the present invention, the rewritable memory may be configured as an EPROM (erasable programmable read-only memory) or an EEPROM (electronically erasable programmable read-only memory), in particular as a flash memory.

DETAILED DESCRIPTION

Figure 1:
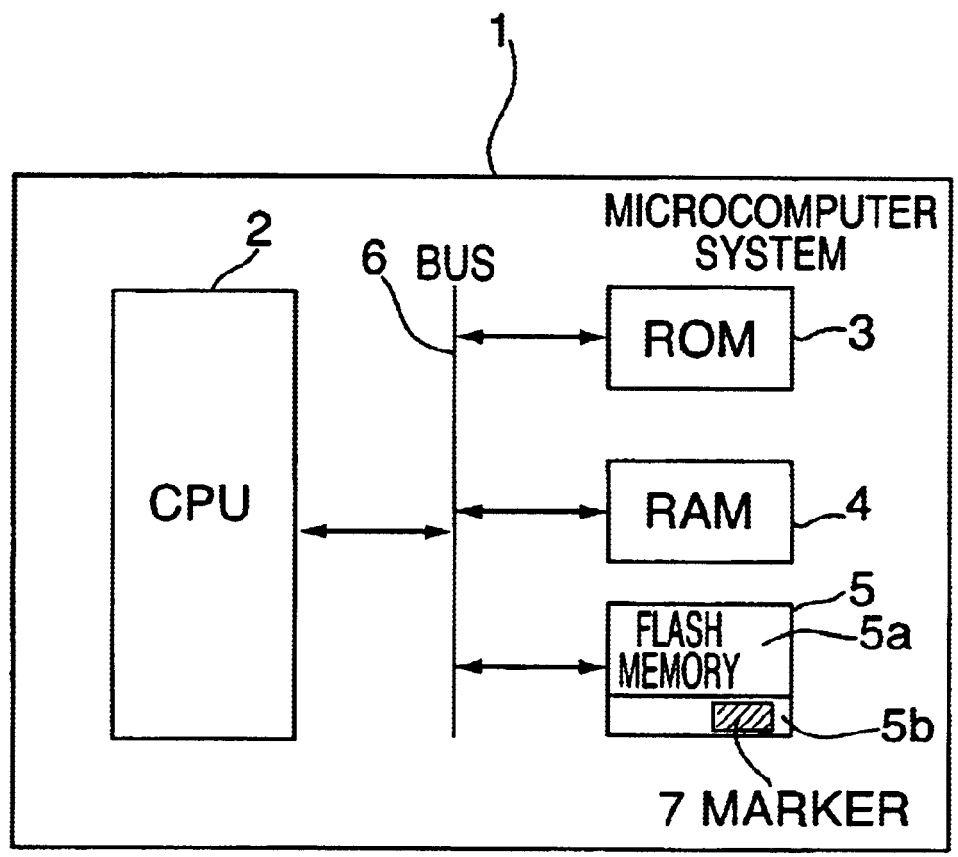
FIG. 1 shows an exemplary microcomputer system according to the present invention.

FIG. 1 shows a microcomputer system 1 including a computer core 2 (central processing unit, CPU) and multiple memories 3, 4, 5. Memories 3, 4, 5 are connected to one another and to computer core 2 via a data connection 6 which is configured as a bus system in the present exemplary embodiment.

Memory 3 is a read-only memory, ROM, memory 4 is a read-write memory (random access memory, RAM) and memory 5 is a rewritable memory (erasable programmable read-only memory, EPROM, electronically erasable programmable read-only memory, EEPROM or flash EPROM). Program commands or data processed by computer core 2 is stored in memories 3, 4, 5. Different data or programs are stored according to the type of memory 3, 4, 5.

Read-only memory 3 contains a fixedly stored program which is alterable only by establishing a new memory module. Therefore, this memory 3 usually holds only a minimum program which enables computer core 2 to execute commands stored in other storage media, in particular in rewritable memory 5. Read-write memory 4 is capable of storing data only during ongoing operation of microcomputer system 1 and is therefore only used as storage for data or program commands during ongoing operation of microcomputer system 1. The memory content of read-write memory 4 may be accessed particularly rapidly, so that to some extent, programs may be transferred to read-write memory 4 from other storage media, e.g., from read-only memory 3 or from rewritable memory 5, to be executed from there. Rewritable memory 5, which is executed as an EPROM or a flash EPROM in the present exemplary embodiment contains program sections or data that are to be alterable within certain limits. This allows adaptation of microcomputer system 1 to different tasks. This is important in particular when microcomputer system 1 is used as a control device for a motor vehicle. Then in addition to the minimum program, the control program for the internal combustion engine or other automotive functions is also stored in read-only memory 3. Then data, e.g., parameters or limiting values for operation of the internal combustion engine accessed by the control program, is stored in rewritable memory 5.

Furthermore, additional program modules which are not to be implemented in each control device, for example, may be stored in rewritable memory 5. Thus a control device may be used for different applications. The control and regulatory functions which are the same for all applications are stored in read-only memory 3, while the programs or data, which differ in the individual applications, are stored in rewritable memory 5.

However, it may be problematical that this increased flexibility may be associated with the risk that unauthorized parties might alter the memory content of rewritable memory 5. When used in a motor vehicle, for example, the power of the internal combustion engine could be increased in this manner by replacing programs or data in rewritable memory 5. However, this increase in power through manipulation of the control program or data may lead to an overload on the engine and ultimately even to an engine defect. To prevent such unwanted manipulation of the memory content of rewritable memory 5, a checking program is provided in read-only memory 3 for executing a checking procedure capable of investigating the content of memory 5 for such inadmissible changes.

Various checking procedures of other systems may be available and may be used as part of the exemplary embodiment and/or exemplary method of the present invention. In particular, a checking procedure which checks for the presence of markers in the program may be used, the markers having been introduced into the program previously at defined locations. As part of the checking procedure, however, a code word, e.g., a checksum, may also be formed over the content of rewritable memory 5 or a portion thereof and then compared with a reference code word. The code word calculation may include the entire program stored in rewritable memory 5 or only portions of the program, depending on the version. The computing time for calculation of the code word is proportional to the size of the storage area to be checked. Depending on the available computing time, the size of the storage area to be checked may therefore be selected so that there is no excessively great burden on execution of the program. Finally, a checking procedure which calculates a signature over the program may also be used, a microcomputer-individual or application-specific value optionally is used as additional information. The signature may be executed, for example, on the basis of an asymmetrical encryption method using a public key accessible to anyone plus a private key accessible to only a limited user group.

Figure 2:
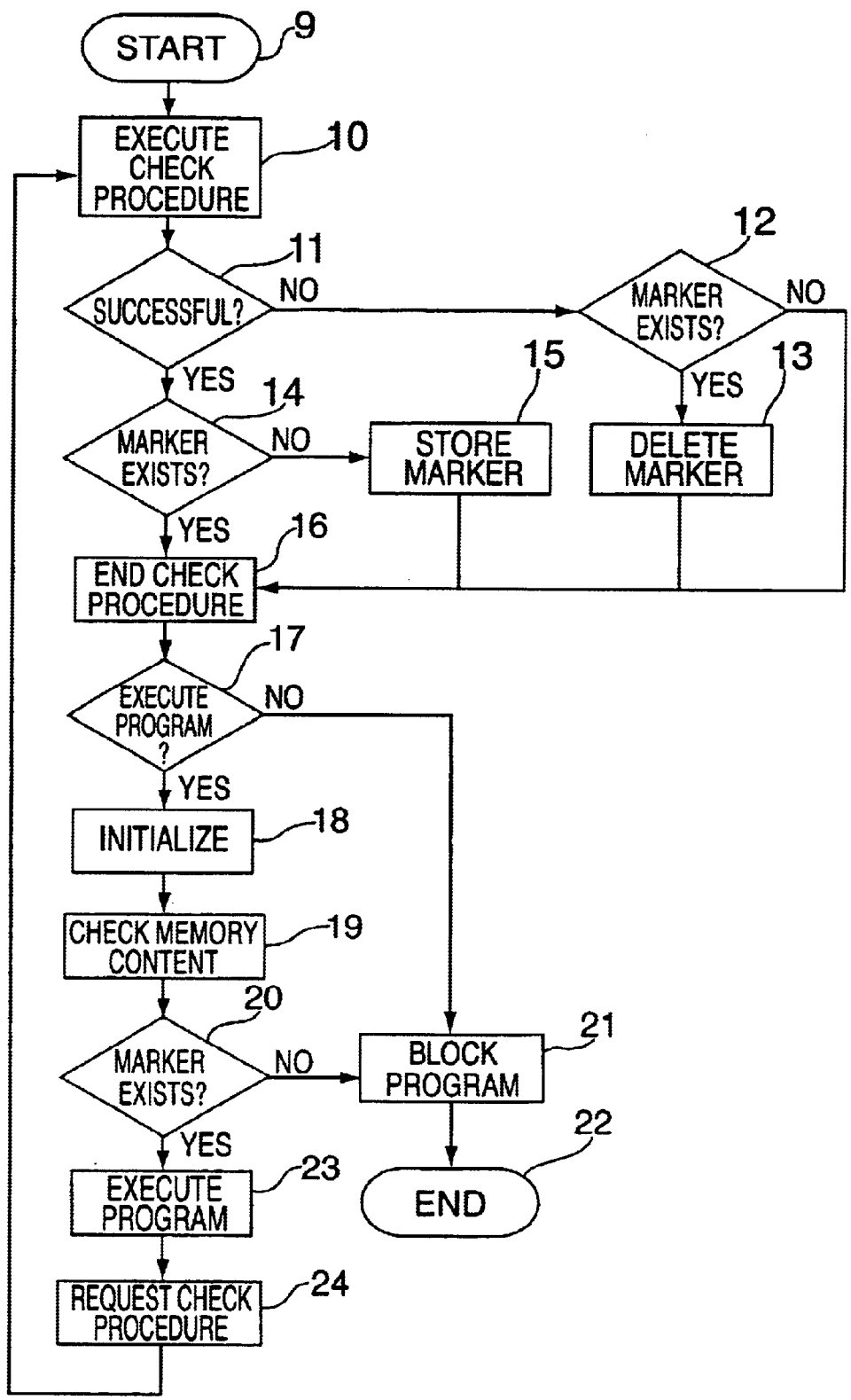
FIG. 2 shows an exemplary flow chart of a method according to the present invention.

FIG. 2 shows a flow chart of an exemplary method according to the present invention. This method begins in a function block 9. In a function block 10 the checking procedure is executed to check on the content of a portion 5a of rewritable memory 5 for manipulated data. A query block 11 then checks to determine whether the check of rewritable memory 5 or portion 5a thereof was successful. If not, this means that manipulation of the program stored in rewritable memory 5 has been detected. A query block 12 then checks to determine whether a marker 7, e.g., a test pattern, has already been stored in a preselectable storage area 5b of rewritable memory 5. If that is the case, marker 7 is deleted in a function block 13, i.e., the test pattern is destroyed. If the checking procedure executed in query block 11 was successful, the sequence branches off from query block 11 to query block 14, where a check determines whether a marker 7 has already been stored in preselectable storage area 5b of rewritable memory 5. If not, then a corresponding marker 7 is stored in a function block 15 to document the validity of the program. The checking procedure is concluded in a function block 16.

Then in a query block 17, a check determines whether the program stored in rewritable memory 5 is to be executed. If so, the program is initialized in a function block 18, i.e., the necessary measures are executed to prepare computer core 2 for running the program. Internal registers of computer core 2 are set at initial values, and computer core 2 is thereby enabled to perform input and output operations necessary for execution of commands. After execution of this boot routine in function block 18, the content of preselectable storage area 5b of rewritable memory 5 is queried in a function block 19. Then a query block 20 checks whether or not marker 7 has been stored in preselectable storage area 5b. If no marker 7 has been stored, this means that the program has been recognized as having been manipulated. Consequently, the sequence branches off to a function block 21 and (further) execution of the program is blocked. As an alternative, other measures may also be taken in response to detection of manipulated data, e.g., emergency operation of the microcomputer system using specified parameters and limiting values. The exemplary method according to the present invention is terminated in a function block 22.

However, if the query in query block 20 has shown that marker 7 has been stored in preselectable storage area 5b, the sequence branches off to a function block 23, where the program is executed (further). The program is executed as long as there is no request for renewed execution of the checking procedure. This request may be made at either precisely preselectable or randomly selected points in time during execution of the program. If such a request has been made (function block 24), the sequence branches back to function block 10 and the checking procedure is executed again. In the new cycle, a different portion of memory 5 is checked from that in the first cycle, so that entire memory 5 is checked after a plurality of cycles.

Microcomputer system 1 is configured as a control device for a motor vehicle for controlling and/or regulating automotive functions, e.g., in an internal combustion engine, an electronic steering or an electronic brake. Through the exemplary method according to the present invention, manipulation of the control program or of parameters or limiting values of the control device may be detected within a very short period of time. In addition, with the exemplary method according to the present invention, a manipulated control program may be blocked within a very short period of time, so that further execution of the control program is no longer allowed. After blocking the control program, the control device may be either shut down or switched to an emergency operation mode, so that automotive functions which are to be controlled and/or regulated may be maintained in an emergency even when the control program is blocked.

What is claimed is:

1. A method of protecting a microcomputer system of a motor vehicle against manipulation of a program, the method comprising:

storing at least one portion of the program in a rewritable memory of the microcomputer system; and executing a checking procedure cyclically at at least one preselectable interval during operation of the microcomputer system, wherein a check is performed as part of the checking procedure to determine whether at least one portion of the rewritable memory includes a specified content.

2. The method of claim 1, wherein execution of the program is blocked as part of the checking procedure if one of the rewritable memory and the at least one portion of the rewritable memory does not include the specified content.

3. The method of claim 1, wherein the at least one portion of the rewritable memory is checked by the checking procedure within a plurality of cycles.

4. The method of claim 1, further comprising:

storing a preselectable marker in a storage area of the microcomputer system if one of the rewritable memory and the at least one portion of the rewritable memory includes the specified content;

checking content of the storage area during execution of the program; and deleting the preselectable marker to block execution of the program.

5. The method of claim 1, further comprising:

checking a storage area of the microcomputer system during execution of the program; and storing a preselectable marker in the storage area to block execution of the program.

6. The method of claim 1, wherein the checking procedure executes as a background application during operation of the microcomputer system.

7. The method of claim 1, wherein the checking procedure executes at noncritical running times during operation of the microcomputer system.

8. The method of claim 1, wherein the microcomputer system is configured as an automotive control device for a motor vehicle for one of controlling and regulating at least one automotive function.

9. A microcomputer system of a motor vehicle having protection against manipulation of a program of the microcomputer system, comprising:

a rewritable memory to store at least one portion of the program; and a checking arrangement to check whether one of the rewritable memory and at least a portion of the rewritable memory includes a specified content, wherein the checking arrangement executes the check cyclically at at least one preselectable interval during operation of the microcomputer system.

10. The microcomputer system of claim 9, wherein the rewritable memory includes a flash memory.

* * * * *